(12) United States Patent
Fang et al.

(10) Patent No.: US 10,735,710 B2
(45) Date of Patent: Aug. 4, 2020

(54) STEREO VISION IMAGE CALIBRATION METHOD AND RELATED IMAGE CAPTURING DEVICE

(71) Applicant: VIVOTEK INC., New Taipei (TW)

(72) Inventors: Jian-Ping Fang, New Taipei (TW); Sheng-Yuan Chen, New Taipei (TW)

(73) Assignee: VIVOTEK INC., New Taipei (TW)

( * ) Notice: Subject to any disclaimer, the term of this patent is extended or adjusted under 35 U.S.C. 154(b) by 199 days.

(21) Appl. No.: 15/700,169

(22) Filed: Sep. 10, 2017

(65) Prior Publication Data

US 2018/0103244 A1     Apr. 12, 2018

(30) Foreign Application Priority Data

Oct. 6, 2016 (TW) .............................. 105132338 A (51) Int. Cl.
*H04N 13/128* (2018.01)
*G06T 7/80* (2017.01)
*H04N 13/239* (2018.01)
*H04N 13/246* (2018.01)
*H04N 13/111* (2018.01)
(Continued)

(52) U.S. Cl.
CPC ............. *H04N 13/128* (2018.05); *G06K 9/03* (2013.01); *G06T 7/85* (2017.01); *H04N 13/111* (2018.05); *H04N 13/239* (2018.05); *H04N 13/246* (2018.05); *G06K 2209/40* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 2011/0249889 A1* | 10/2011 | Kothandaraman | ....... G06T 7/32 382/154 |
| 2012/0069004 A1 | 3/2012 | Takama | |
| 2015/0146103 A1* | 5/2015 | Koo | ...... H04N 19/597 348/607 |

FOREIGN PATENT DOCUMENTS

| | | |
|---|---|---|
| TW | 201318407 A1 | 5/2013 |
| TW | 201519635 A | 5/2015 |
| TW | 201613349 A | 4/2016 |

OTHER PUBLICATIONS

Papadimitriou et al., "Epipolar line estimation and rectification for stereo images pairs" IEEE Transactions on Image Processing, 3(4):672-676, Apr. 1996 (Year: 1996).*

(Continued)

*Primary Examiner* — Stuart D Bennett
(74) *Attorney, Agent, or Firm* — Winston Hsu (57) ABSTRACT

A stereo vision image calibration method is applied to an image capturing device having a first camera, a second camera and an image rectifying function. The first camera and the second camera are arranged along a first direction. The first camera and the second camera are respectively utilized to acquire a first image and a second image. The image rectifying function rectifies the first image and the second image by a stereo vision parameter. The stereo image calibration method includes selecting the rectified first image and the rectified second image to compute a global disparity vector between the adjust image and the reference image, and if a vector component of the global disparity vector along a second direction which is different from the first direction has non-zero value, processing a stereo vision calibration according to the vector component.

16 Claims, 6 Drawing Sheets

(51) Int. Cl.
*G06K 9/03* (2006.01)
*H04N 13/00* (2018.01)

(56) References Cited

OTHER PUBLICATIONS

Liu et al., "A SIFT descriptor based method for global disparity vector estimation in multivew video coding" 2010 IEEE International Conference on Multimedia and Expo (ICME), IEEE, pp. 1214-1218 (Year: 2010).*

Ahuja "Correlation based similarity measures-Summary" https://disshantahuja.wordpress.com/2010/04/, Apr. 2010 (Year: 2010).*

Liu et al., "A SIFT descriptor based method for global disparity vector estimation in multiview video coding" 2010 IEEE International Conference on Multimedia and Expo (ICME), IEEE, pp. 1214-1218 (Year: 2010).*

* cited by examiner

STEREO VISION IMAGE CALIBRATION METHOD AND RELATED IMAGE CAPTURING DEVICE

BACKGROUND OF THE INVENTION

1. Field of the Invention

The present invention relates to a stereo vision image calibration method and a related image capturing device, and more particularly, to a stereo vision image calibration method and a related image capturing device capable of automatically repairing deviation of its camera.

2. Description of the Prior Art

With the advanced technology, the stereo vision camera device is widespread applied in daily life. The stereo vision camera device may have two image capturing units disposed on different position, and the image capturing units provide two images having different visual angles for a stereo vision image computation, such as a depth map. In an installing process of the stereo vision camera device, the two image capturing units may have position offset due to unpredictable impact, operational error, unstable installation of the base, or thermal expansion and contraction resulted by temperature variation. As position of the image capturing units are deviated, the stereo vision image computation based on the images captured by the image capturing units becomes abnormal. Thus, design of a stereo vision camera device and a related stereo vision image calibration method capable of automatically repairing deviation is an important issue in the monitoring industry.

SUMMARY OF THE INVENTION

The present invention provides a stereo vision image calibration method and a related image capturing device capable of automatically repairing deviation of its camera for solving above drawbacks.

According to the claimed invention, a stereo vision image calibration method is applied to an image capturing device having a first camera, a second camera and an image rectifying function, the first camera and the second camera are arranged along a first direction and utilized to respectively capture a first image and a second image, and the image rectifying function is adapted to rectify the first image and the second image by a stereo vision parameter built in production to generate a rectified first image and a rectified second image. The stereo vision image calibration method includes setting the rectified first image as a reference image and setting the rectified second image as an adjusting image, computing a global disparity vector between the adjusting image and the reference image, and processing a stereo vision calibration according to a vector component of a second direction different from the first direction of the global disparity vector while the vector component has a non-zero value.

According to the claimed invention, an image capturing device with a stereo vision image calibration function includes a first camera, a second camera, an image rectifying function and an operational processor. The first camera is adapted to capture a first image. The second camera is adapted to capture a second image having a visual angle different from the first image. The image rectifying function is electrically connected to the first camera and the second camera, and adapted to rectify the first image and the second image as a rectified first image and a rectified second image. The operational processor is electrically connected to the image rectifying function and adapted to set the rectified first image as a reference image and set the rectified second image as an adjusting image, to compute a global disparity vector between the adjusting image and the reference image, and to process a stereo vision calibration according to a vector component of a second direction different from the first direction of the global disparity vector while the vector component has a non-zero value.

The stereo vision image calibration method of the present invention utilizes the first image and the second image respectively captured by the first camera and the second camera for rectification to compute the disparity motion vector and the similar value so as to find out the global disparity vector, and then the cropping range of the cameras or the stereo vision parameter can be varied to calibrate distortion of the stereo vision image resulted by position deviation about the two cameras of the image capturing device, to ensure that the image capturing device can provide the high quality stereo vision image since the two images captured by the two cameras from different visual angles after calibration are highly overlapped. Comparing to the prior art, the present invention can effectively solve the distortion of the stereo vision image resulted by an installation fault of the image capturing device, so as to automatically repair the said fault and to prevent unpredictable risk such as environmental weather, so the image capturing device can be kept in best state at any time.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
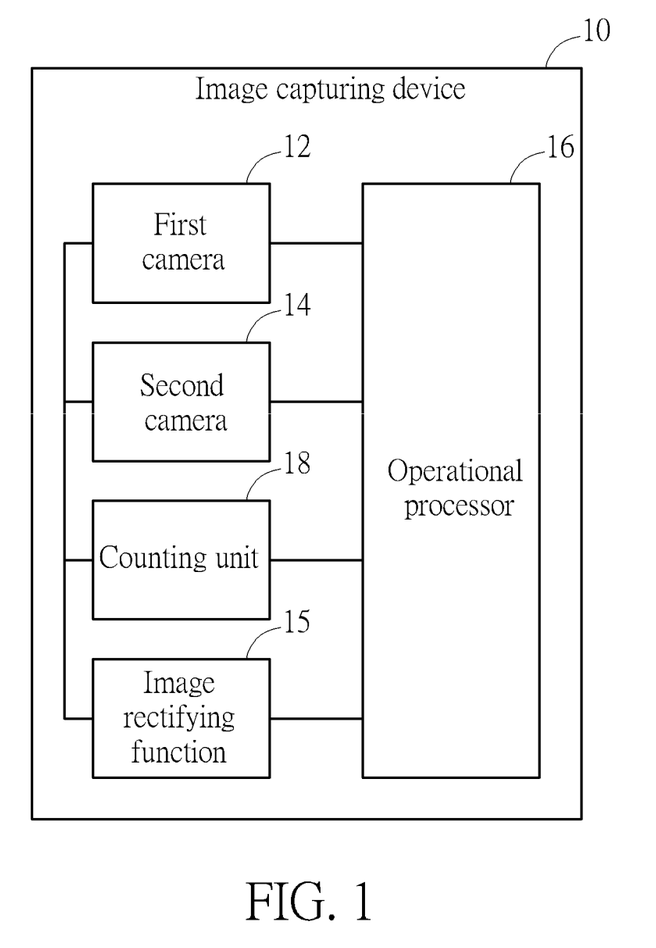
FIG. 1 is a functional block diagram of an image capturing device according to an embodiment of the present invention.
Figure 2:
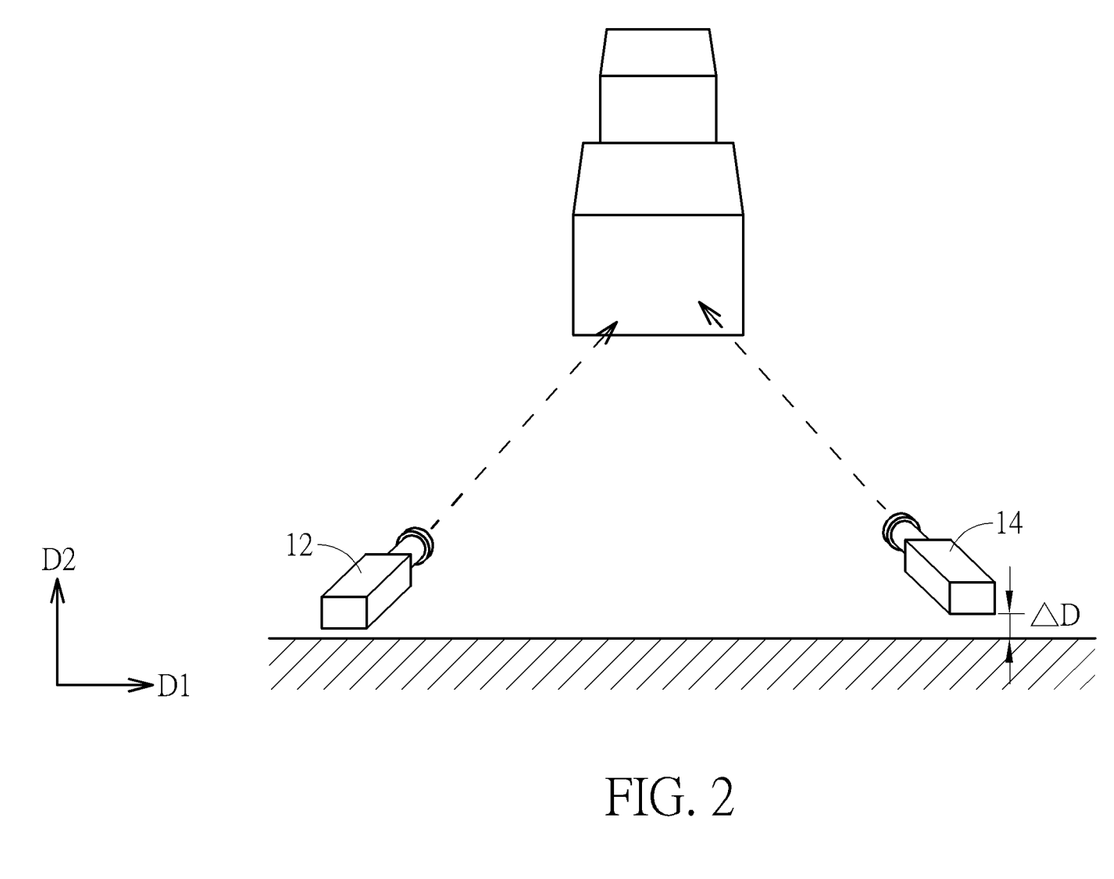
FIG. 2 is an arrangement diagram of two cameras according to the embodiment of the present invention.
Figure 3:
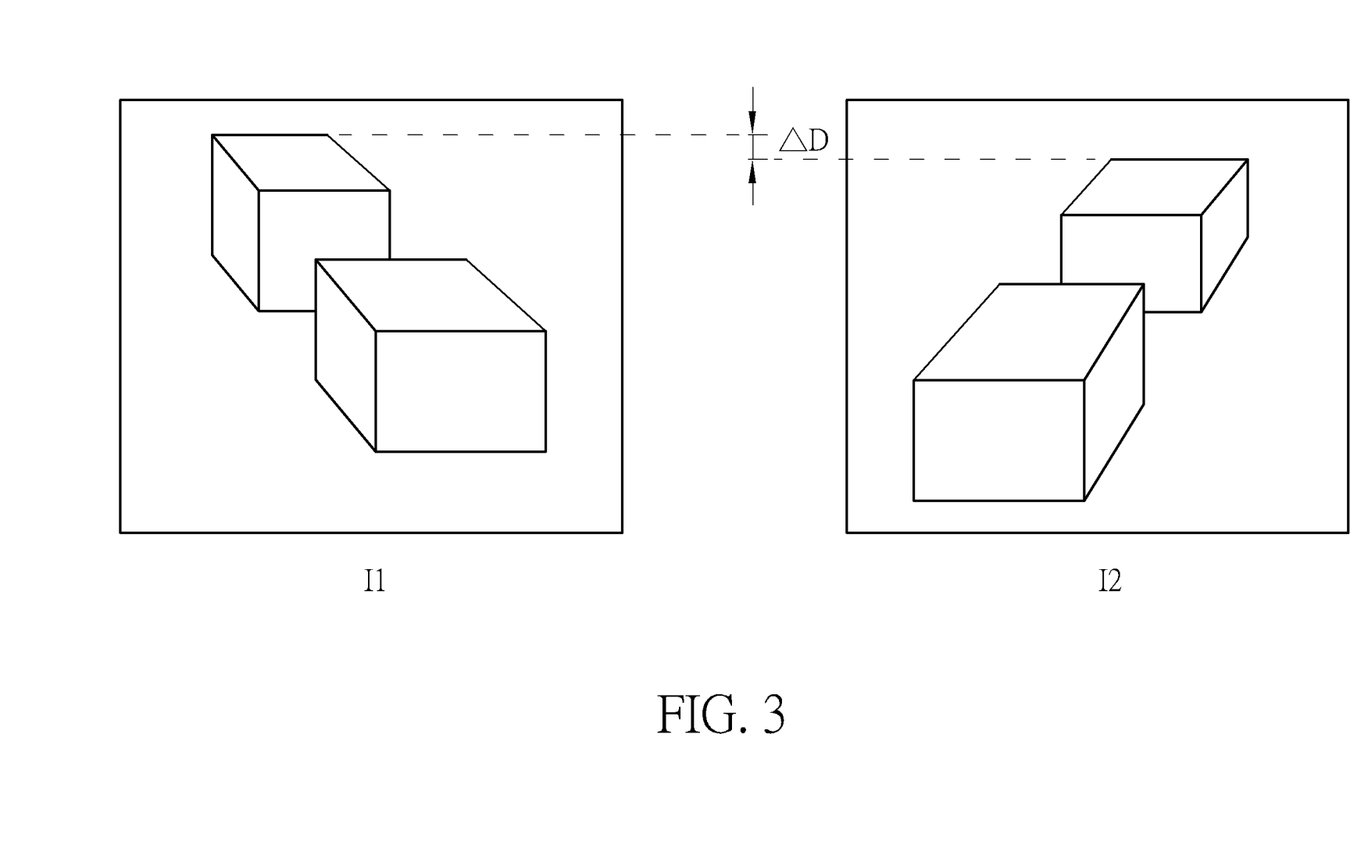
FIG. 3 is a diagram of two images with different visual angles according to the embodiment of the present invention.

Please refer to FIG. 1 to FIG. 3. FIG. 1 is a functional block diagram of an image capturing device 10 according to an embodiment of the present invention. FIG. 2 is an arrangement diagram of two cameras according to the embodiment of the present invention. FIG. 3 is a diagram of two images with different visual angles according to the embodiment of the present invention. The image capturing device 10 includes a first camera 12, a second camera 14, an image rectifying function 15 and an operational processor 16. The first camera 12 and the second camera 14 are arranged along a first direction D1, and are utilized to respectively capture a first image I1 and a second image I2 with different visual angles. The image rectifying function 15 is electrically connected to the first camera 12 and the second camera 14, and can be used to rectify the first image I1 and the second image I2 according to a stereo vision parameter built in production, which means the stereo vision parameter can be loaded when the image capturing device 10 is manufactured on production line of the factory, so as to result a rectified first image I1' and a rectified second image I2' located at the same coordinate plane and aligned with the first direction D1. For example, assume the first direction D1 is horizontal direction, an object (such as the table) inside the rectified first image I1' has a corner point (such as at one of the four table corners), coordinates of the said corner point is (X1, Y1), coordinates of the same corner point (which means at the same table corner) of the object (which means the same table shown in the rectified first image I1') inside the rectified second image I2' is (X2, Y2), then Y1 equals Y2. Rectification of the image rectifying function 15 can be executed via conventional computation, such as the technical literature of D. V. Papadimitriou and T. J. Dennis. Epipolar line estimation and rectification for stereo images pairs. IEEE Transactions on Image Processing, 3(4):672-676, April 1996, and a detailed description is omitted herein for simplicity. The rectified first image I1' and the rectified second image I2' can be utilized to execute the stereo vision image computation, such as computation of a depth map, by the operational processor 16. The operational processor 16 has an image rectifying function 15. While arrangement of the first camera 12 and the second camera 14 along a second direction D2 different from the first direction D1 has slight deviation of ΔD relative to the original production design, the operational processor 16 can execute stereo vision image calibration procedure of the present invention for repair, to acquire the correct stereo vision image computation result. The first direction D1 is preferably perpendicular to the second direction D2.

As the first camera 12 and the second camera 14 are arranged along the second direction D2, which is not shown in figures, and arrangement of the first camera 12 and the second camera 14 along the first direction D1 is slightly deviated relative to the original production design, the operational processor 16 can execute the stereo vision image calibration procedure of the present invention to repair and acquire the correct stereo vision image computation result. The image rectifying function 15 rectifies the first image I1 and the second image I2 via the stereo vision parameter built in the production, and the rectified first image I1' and the rectified second image I2' can be located at the same coordinate plane and aligned with the second direction D2. For example, assume the second direction D2 is the vertical direction, the rectified first image I1' contains an object (such as the table) having a corner point (such as at one of the four table corners), coordinates of the said corner point is (X1, Y1), coordinates of the same corner point (which means at the same table corner) of the object (which means the same table shown in the rectified first image I1') inside the rectified second image I2' is (X2, Y2), then X1 equals X2.

Figure 4:
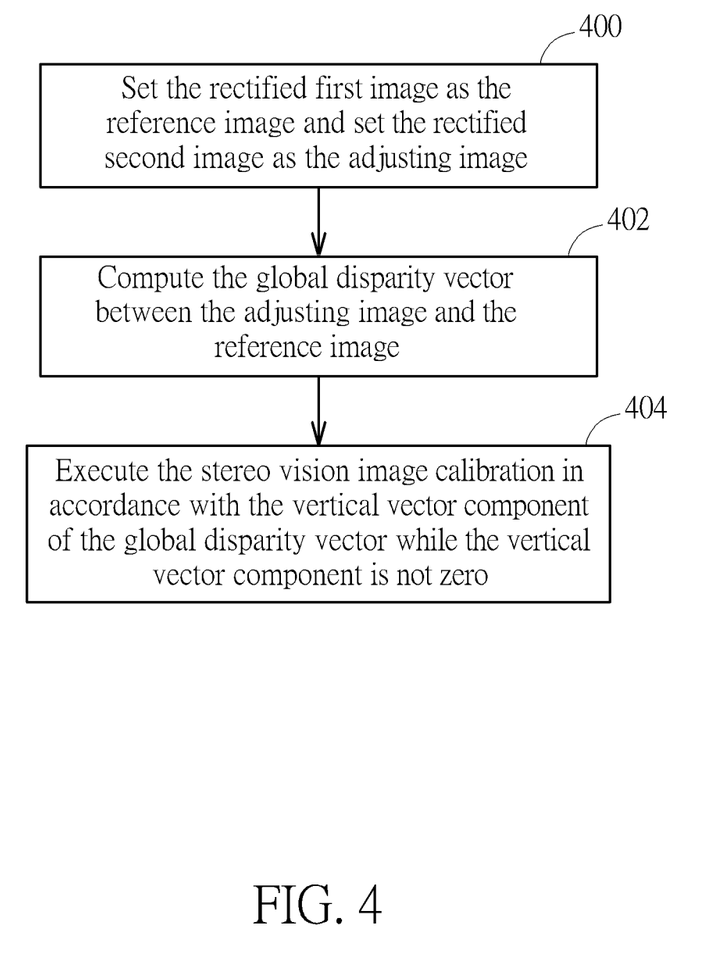
FIG. 4 is a flow chart of a stereo vision image calibration method according to the embodiment of the present invention.
Figure 5:
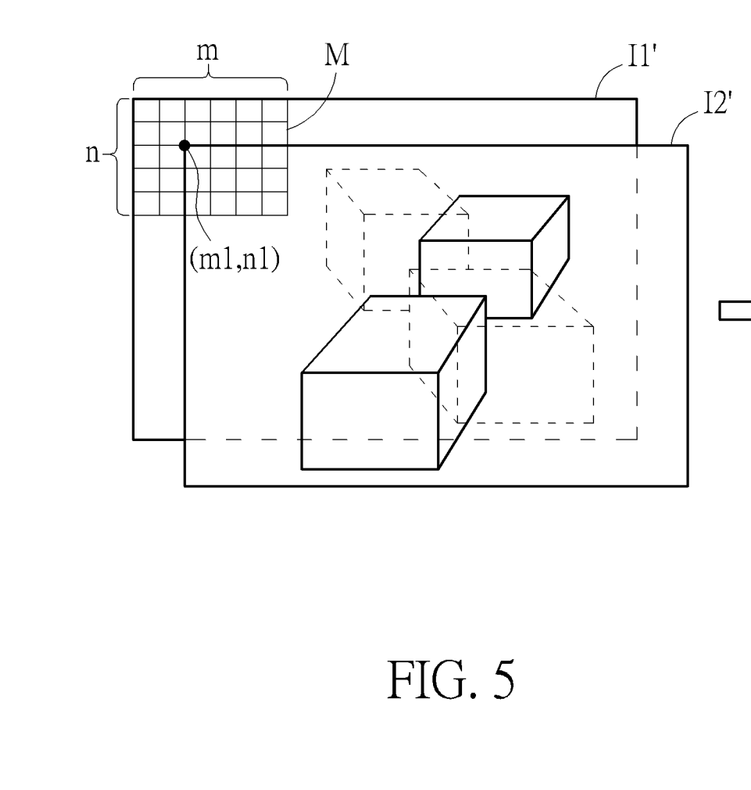
FIG. 5 and FIG. 6 respectively are diagrams of the disparity motion vector in different operation according to the embodiment of the present invention.
Figure 6:
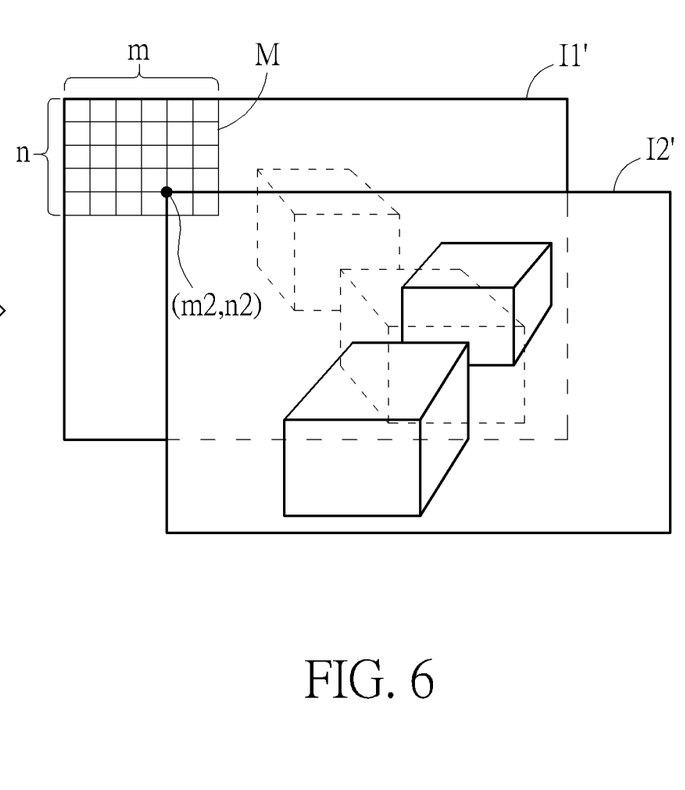

Please refer to FIG. 4 to FIG. 6. FIG. 4 is a flow chart of a stereo vision image calibration method according to the embodiment of the present invention. FIG. 5 and FIG. 6 respectively are diagrams of the disparity motion vector in different operation according to the embodiment of the present invention. First, step 400 is executed to set the rectified first image I1' as a reference image and set the rectified second image I2' as an adjusting image. A searching range M can be set within the rectified first image I1', such as a m*n matrix, and the rectified second image I2' can be moved relative to the rectified first image I1' within the searching range M, so as to acquire a plurality of disparity motion vectors (an amount of the disparity motion vectors equals m*n). The rectified second image I2' can be moved from left to right and from top to down, corner coordinates can be varied as (0,0), (0,1), . . . , (0,m), (1,0), (1,1), (1,m), (2,0), and variation of the said coordinates is not limited to the above-mentioned embodiment, which depends on design demand. Then, step 402 is executed to compute a similar value corresponding to each disparity motion vector.

Following statement has an example of the disparity motion vectors (m1, n1) and (m2, n2), as shown in FIG. 5 and FIG. 6.

The present invention may use various ways to compute the similar value, for example, the similar value can be a reciprocal of an error value. As shown in FIG. 5, the error value, which corresponds to the disparity motion vector (m1, n1), is equal to an average of total absolute value of pixel value difference between overlapped pixels on the adjusting image and the reference image while the adjusting image (which means the rectified second image I2') is moved relative to the reference image (which means the rectified first image I1') according to the disparity motion vector (m1, n1). As shown in FIG. 6, the error value, which corresponds to the disparity motion vector (m2, n2), is equal to an average of total absolute value of pixel value difference between overlapped pixels on the adjusting image and the reference image while the adjusting image (which means the rectified second image I2') is moved relative to the reference image (which means the rectified first image I1') according to the disparity motion vector (m2, n2). Step 402 can generate several error values (having an amount of m*n) while the rectified second image I2' is moved relative to the rectified first image I1' within the searching range M to acquire the disparity motion vectors (having the amount of m*n). Then, a disparity motion vector corresponding to one of the error values which has maximal reciprocal can be selected and defined as the global disparity vector. Step 404 is executed that the stereo vision image calibration can be functioned in accordance with a vertical vector component (ny) of the global disparity vector (mx, ny) while the first camera 12 and the second camera 14 are arranged along the horizontal direction and the vertical vector component (ny) has a non-zero value, or the stereo vision image calibration can be functioned in accordance with a horizontal vector component (mx) of the global disparity vector (mx, ny) while the first camera 12 and the second camera 14 are arranged along the vertical direction and the horizontal vector component (mx) has the non-zero value.

Figure 7:
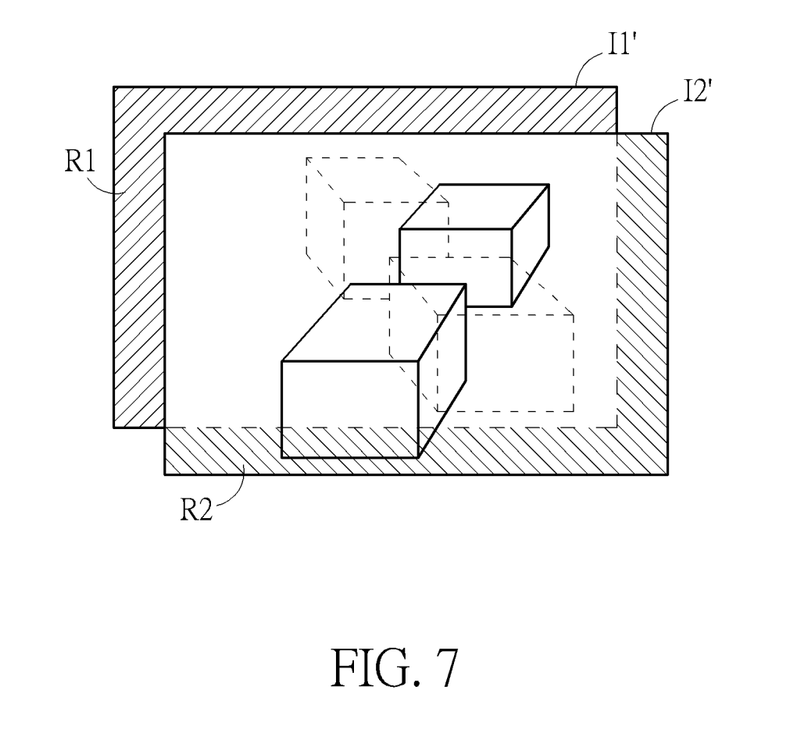
FIG. 7 is a diagram of the adjusting image and the reference image not completely overlapped according to the embodiment of the present invention.

It should be mentioned that a part of pixels on the adjusting image (which means the rectified second image I2') may be not overlapped with the reference image (which means the rectified first image I1') while the adjusting image is moved relative to the reference image within the searching range M. Please refer to FIG. 7. FIG. 7 is a diagram of the adjusting image and the reference image not completely overlapped according to the embodiment of the present invention. Non-overlapped regions R1 and R2 may be formed while the adjusting image (which means the rectified second image I2') is shifted relative to the reference image (which means the rectified first image I1'), the non-overlapped regions R1 and R2 may contain pixels about one of the adjusting image and the reference image; therefore, the stereo vision image calibration method of the present invention does not compute pixels inside the non-overlapped regions R1 and R2 during the above-mentioned error value computation.

The present invention sets the searching range and the similar value computation to determine the global disparity vector, but the present invention is not limited by it. The present invention can determine the global disparity vector based on image correlation measurement or characteristic point computation. The said image correlation measurement can be referred to the webpage: https://siddhantahuja.wordpress.com/2010/04/11/correlation-based-similarity-measures-summary/. The said characteristic point computation about the global disparity vector can be referred to the technical literature: Liu, K. H., Liu, T. J., and Liu, H. H. A SIFT descriptor based method for global disparity vector estimation in multiview video coding, 2010 IEEE International Conference on Multimedia and Expo (ICME), IEEE, pp. 1214-1218.

In step 404, the stereo vision image calibration method can vary a cropping range of the first camera 12 or the second camera 14 to overcome the deviation of ΔD; for example, while the stereo vision image calibration is functioned according to the vertical vector component (ny) of the global disparity vector (mx, ny) and the said vertical vector component (ny) is equal to 3, the cropping range of the first camera 12 or the second camera 14 can be varied to vertically shift S pixels, and the amount of S is the amount of deviated pixels of the first camera 12 or the second camera 14 corresponds to 3 pixels in the image rectifying function 15; further, the stereo vision parameter of the image rectifying function 15 can be varied to overcome the deviation of ΔD. In addition, as shown in FIG. 1, the image capturing device 10 may include a counting unit 18 electrically connected to the operational processor 16 and the image rectifying function 15. After execution of step 404, the stereo vision image calibration method of the present invention can optionally utilize the counting unit 18 to periodically execute steps 400, 402 and 404.

The above-mentioned embodiment sets the rectified first image I1' as the reference image and sets the rectified second image I2' as the adjusting image; however, the present invention can alternatively set the rectified first image I1' as the adjusting image and sets the rectified second image I2' as the reference image.

In conclusion, the stereo vision image calibration method of the present invention utilizes the first image and the second image respectively captured by the first image capturing unit and the second image capturing unit for rectification to compute the disparity motion vector and the similar value so as to find out the global disparity vector, and then the cropping range of the image capturing units or the stereo vision parameter can be varied to calibrate distortion of the stereo vision image resulted by position deviation about the two image capturing units of the image capturing device, to ensure that the image capturing device can provide the high quality stereo vision image since the two images captured by the two image capturing units from different visual angles after calibration are highly overlapped. Comparing to the prior art, the present invention can effectively solve the distortion of the stereo vision image resulted by an installation fault of the image capturing device, so as to automatically repair the said fault and to prevent unpredictable risk such as environmental weather, so the image capturing device can be kept in best state at any time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stereo vision image calibration method, applied to an image capturing device having a first camera, a second camera and an operational processor with an image rectifying function, the first camera and the second camera being arranged along a first direction and utilized to respectively capture a first image and a second image, the image rectifying function being adapted to rectify the first image and the second image by a stereo vision parameter built in production to generate a rectified first image and a rectified second image, the stereo vision image calibration method comprising:

setting the rectified first image as a reference image and setting the rectified second image as an adjusting image;

moving the adjusting image relative to the reference image and defining an overlapped region and at least one non-overlapped region between the adjusting image and the reference image in each movement;

compute pixel value difference between overlapped pixels within each overlapped region for deciding a global disparity vector; and dividing the global disparity vector into two vector components respectively in the first direction and a second direction different from arrangement direction of the first camera and the second camera for processing a stereo vision calibration along the vector component in the second direction while the vector component in the second direction has a non-zero value.

2. The stereo vision image calibration method of claim 1, further comprising:

setting a searching range on the reference image;

moving the adjusting image relative to the reference image within the searching range to acquire a plurality of disparity motion vectors and to compute a similar value corresponding to each of the plurality of disparity motion vectors; and utilizing one of the plurality of disparity motion vectors with a maximum similar value to acquire the global disparity vector between the rectified first image and the rectified second image.

3. The stereo vision image calibration method of claim 2, wherein the searching range is a rectangle, and the plurality of disparity motion vectors cover all position of the searching range.

4. The stereo vision image calibration method of claim 2, wherein the similar value is acquired by averaged error computation of overlapped images between the adjusting image and the reference image while the adjusting image is moved relative to the reference image according to the disparity motion vector.

5. The stereo vision image calibration method of claim 2, wherein the similar value is acquired by image correlation measurement.

6. The stereo vision image calibration method of claim 2, wherein the similar value is acquired by characteristic point computation.

7. The stereo vision image calibration method of claim 1, wherein processing the stereo vision calibration according to the vector component of the second direction different from the first direction comprises:

varying a cropping range of at least one of the first camera and the second camera of the image capturing device.

8. The stereo vision image calibration method of claim 1, wherein processing the stereo vision calibration according to the vector component of the second direction different from the first direction comprises:

varying the stereo vision parameter of the image rectifying function.

9. An image capturing device with a stereo vision image calibration function, the image capturing device comprising:

a first camera adapted to capture a first image;

a second camera adapted to capture a second image having a visual angle different from the first image; and an operational processor with an image rectifying function for rectifying the first image and the second image as a rectified first image and a rectified second image and adapted to set the rectified first image as a reference image and set the rectified second image as an adjusting image, to move the adjusting image relative to the reference image and defining an overlapped region and at least one non-overlapped region between the adjusting image and the reference image in each movement, to compute pixel value difference between overlapped pixels within each overlapped region for deciding a global disparity vector, and to divide the global disparity vector into two vector components respectively in the first direction and a second direction different from arrangement direction of the first camera and the second camera for processing a stereo vision calibration along the vector component in the second direction while the vector component in the second direction has a non-zero value.

10. The image capturing device of claim 9, wherein the operational processor is further adapted to set a searching range on the reference image, to move the adjusting image relative to the reference image within the searching range to acquire a plurality of disparity motion vectors and to compute a similar value corresponding to each of the plurality of disparity motion vectors, and to utilize one of the plurality of disparity motion vectors with a maximum similar value to acquire the global disparity vector between the rectified first image and the rectified second image.

11. The image capturing device of claim 10, wherein the searching range is a rectangle, and the plurality of disparity motion vectors cover all position of the searching range.

12. The image capturing device of claim 10, wherein the similar value is acquired by averaged error computation of overlapped images between the adjusting image and the reference image while the adjusting image is moved relative to the reference image according to the disparity motion vector.

13. The image capturing device of claim 10, wherein the similar value is acquired by image correlation measurement.

14. The image capturing device of claim 10, wherein the similar value is acquired by characteristic point computation.

15. The image capturing device of claim 9, wherein the operational processor is further adapted to vary a cropping range of at least one of the first camera and the second camera of the image capturing device.

16. The image capturing device of claim 9, wherein the operational processor is further adapted to vary the stereo vision parameter of the image rectifying function.

* * * * *